United States Patent
Acker et al.

(10) Patent No.: US 6,684,387 B1
(45) Date of Patent: *Jan. 27, 2004

(54) METHOD AND APPARATUS FOR VERIFYING ENTERPRISE JAVA BEANS

(75) Inventors: Liane Elizabeth Haynes Acker, Orange Park, FL (US); Ajay A. Apte, Austin, TX (US); Ping Chen, Austin, TX (US); Karalee Brown LeBlanc, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,404

(22) Filed: Sep. 23, 1999

(51) Int. Cl.[7] .................................................. G06F 9/44
(52) U.S. Cl. ...................................... 717/126; 707/203
(58) Field of Search ................................ 707/203–204, 707/103 Y, 10; 717/102, 120–126, 174

(56) References Cited

U.S. PATENT DOCUMENTS

| | | | |
|---|---|---|---|
| 5,692,047 A | 11/1997 | McManis | 713/167 |
| 5,748,964 A | 5/1998 | Gosling | 717/126 |
| 6,161,107 A | * 12/2000 | Stern | 707/10 |
| 6,269,373 B1 | * 7/2001 | Apte et al. | 707/10 |
| 6,298,353 B1 | * 10/2001 | Apte | 707/10 |
| 6,434,740 B1 | * 8/2002 | Monday et al. | 717/108 |

OTHER PUBLICATIONS

Michael Shoffner, "Write a Session Bean," Jul. 1998, Java World, http://www.javaworld.com/javaworld/jw-07-1998/jw-07-sept_p.html.*

Chan, et. al., "Developing enterprise beans with VisualAge for Java," Aug. 1999, IBM Developer Works (http://www-106.ibm.com), pp. 1–7.*

* cited by examiner

*Primary Examiner*—John Chavis
*Assistant Examiner*—L J Shrader
(74) *Attorney, Agent, or Firm*—David A. Mims, Jr.; Bracewell & Patterson, L.L.P.

(57) ABSTRACT

The introspection capability of Java is utilized by the described verification tool to verify validity of a target bean's Java Archive (JAR) file. The deployment descriptor class is verified first according to Enterprise Java Bean. specification rules. The remaining classes: remote interface, home interface and bean class are all loaded into a Java Virtual Machine (JVM) and verified by the described verification tool through Java introspection.

14 Claims, 9 Drawing Sheets

METHOD AND APPARATUS FOR VERIFYING ENTERPRISE JAVA BEANS

BACKGROUND OF THE INVENTION

1. Technical Field

The present invention generally relates to distributed data processing systems and in particular to server programming in distributed data processing systems. Still more particularly, the present invention relates to verification tools for pre-developed program applications deployed to the distributed data processing systems.

2. Description of the Related Art

Java™ (a trademark of Sun Microsystems, Inc. of San Jose, Calif.) is a type of object-oriented software programming language that enables programmers to create program applications and small programs called applets. A virtual machine is generated-by Java™ (Java) that provides a control interface allowing a Java™ program to overlay and operate on virtually any operating system.

Java was developed with distributed computing, low to no administration and platform independence in mind. The Java platform for enterprise-capable Java computing utilizes Enterprise JavaBean™ (EJBean) (trademark of Sun Microsystems) technology that provides for the development and deployment of reusable server components. EJBean (referred to hereinafter as Enterprise Java Bean, EJB or EJBean) server components are serveriside object oriented objects that run in an application server, with interfaces, that are typically deployed on one computer and may be invoked by a client from another computer and manipulate a database management system on the server. EJBeans are stored in a Java Archive (JAR) file which contains a Manifest file located at META-INF/MANIFEST.MF within the archive.

Referring to FIG. 3, a block diagram of a prior art JAR file, is illustrated. EJBeans are typically distributed and installed in a development environment by packaging them in a JAR file. These files are essentially ZIP files that are created using a JAR utility. The illustrated JAR file has subdirectory 300 of meta-information that is always named META-INF. Subdirectory 300 contains a single Manifest file 302 that is always named MANIFEST.MF. The MANFEST.MF file contains arbitrary information about the files in the archive, such as their encoding or language. The JAR file is capable of containing signature files named "name.SF" 304. There is one of these files for each entry that has signed files in the archive. In addition, the JAR file may contain zero or more digital signature files named "name.suf" 306, where the suffix (e.g., RSA) is determined by the digital signature format. There is a least one of these files for each signature instruction file. In addition to the MANIFEST.MF subdirectory, the archive contains whatever files (EJBean) 308 a user wishes to package in the archive.

EJBeans operate within-logical "containers" and are designed to support high scalability using a multi-tier distributed application architecture. (architecture that has multiple application components) and the multi-tier orientation provides many advantages over traditional client/server architectures. Containers provide security, remote access, concurrency, transactions, etc., and may span multiple servers. EJBean components:contain no system level programming, include only business related logic and are fully portable across any EJBean compliant server and any Operating System (OS). Some advantages to EJBean components include reusability, performance, scalability, wire protocol neutral architecture and manageability among others.

Locating logic, EJBeans, for manipulating data on one or more servers allows an application to operate in multi-processing and multi-threaded systems. Server components can be replicated and distributed across multiple systems enabling multi-tier systems with a scalability of essentially no limit. With a multi-tier environment, reliability is high and manageability is easier because most of the application logic is on the server.

A server component is a reusable software application that performs specific functions and is accessible to any other application through the server component's interface. A server component can be developed for one application and reused in another application that may require the function. Basically, server components are basic building blocks that have specific, published functions that can be combined with other components and applications into a configuration that performs a task designed by a developer.

Traditionally, a Java Virtual Machine (JVM) allows a Java application to run on any operating system, but server side components require proprietary programming interfaces based on vendor software and hardware. EJBean serve side components are portable and virtually vehdor-independent on all Java EJBean compliant application servers. With server component portability, increased scalability, reliability and re-usability, EJBean components can be moved from one execution environment to another without requiring any recoding Determining whether a new component is valid is a problem that accompanies portability and reusability of EJBean components. EJBean components are required to implement a specific set of interfaces with the container that encloses the beans so the container can manage and control the bean. If the component has a purported function and is moved from one execution environment to another, the component should be validated before being deployed throughout the system served by an EJBean compliant server.

Therefore, it would be desirable for the EJBean server program to validate, before deploying, any EJBean server component. It would also be desirable to validate a newly developed EJBean server component. It would further be desirable have the capability to verify any EJBean component at any time, even during operation.

SUMMARY OF THE INVENTION

It is therefore one object of the present invention to provide a tool that will enable a developer to verify an EJBean server component prior to use in a data processing system.

It is another object of the present invention to provide a tool that will validate an EJBean server component utilizing a Java Archive file.

It is yet another object of the present invention to provide a tool that will validate an EJBean component prior to deployment.

The foregoing objects are achieved as is now described. The introspection capability of Java is utilized by the described verification tool to verify validity of a target bean's Java Archive (JAR) file. The deployment descriptor class is verified first according to Enterprise Java Bean specification rules. The remaining classes: remote interface, home interface and bean class are all loaded into a Java Virtual Machine (JVM) and verified by the described verification tool through Java introspection.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
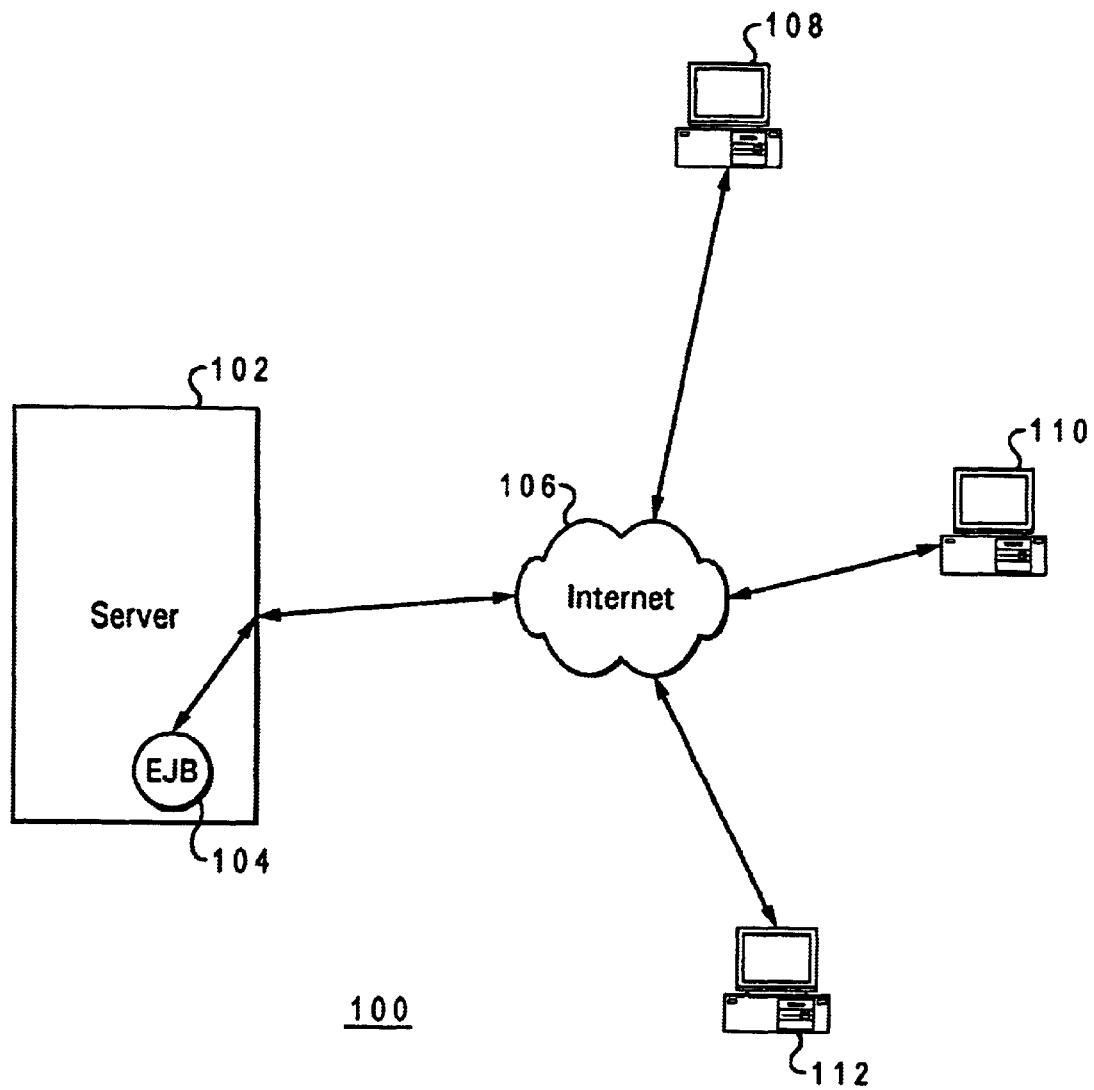
FIG. 1A depicts a distributed computing system in accordance with a preferred embodiment of the present invention.

With reference now to the figures, and in particular with reference to FIG. 1, a distributed computing system in accordance with a preferred embodiment of the present invention, is depicted. System 100 includes server 102, Enterprise Java Bean 104 (EJBean), Internet 106 and separate installations 108 through 112. On server 102, multiple EJBean 104 components may exist at any one time, providing various business related functions. Server 102 must be Enterprise Java Bean compliant and must supply a standard set of services to support EJBean 104 components. Additionally, server 102 must provide a container for the EJBean 104 component which implements control and management for classes of the EJBean 104. Since EJBean 104 components do not require a specific container system, virtually any application server can be adapted to support EJBean 104 components, by adding support for the service defined in the EJB specification.

In the present invention, Internet 106 provides the connection between systems 108–112 and systems 108–112 represent Local Area Networks (LAN), standalone computers, Wide Area Networks (WAN), any data processing system that may connect with server 102 through Internet 106. Multiple systems may connect at the same time with EJBean 104, via home and remote interfaces, utilizing Internet 106 browser clients. Each Enterprise Java Bean is stored in a logical container (see FIG. 1B) and any number of EJBean 104 classes can be present in a single container.

A container may not necessarily be present in a single server location and the EJB container could be replicated and distributed across many systems. EJBean 104 may be transient or persistent. A transient bean is termed a "session" bean and a persistent bean is termed an "entity" bean. Session beans are temporary and usually exist only for a single client/server session.

Figure 1B:
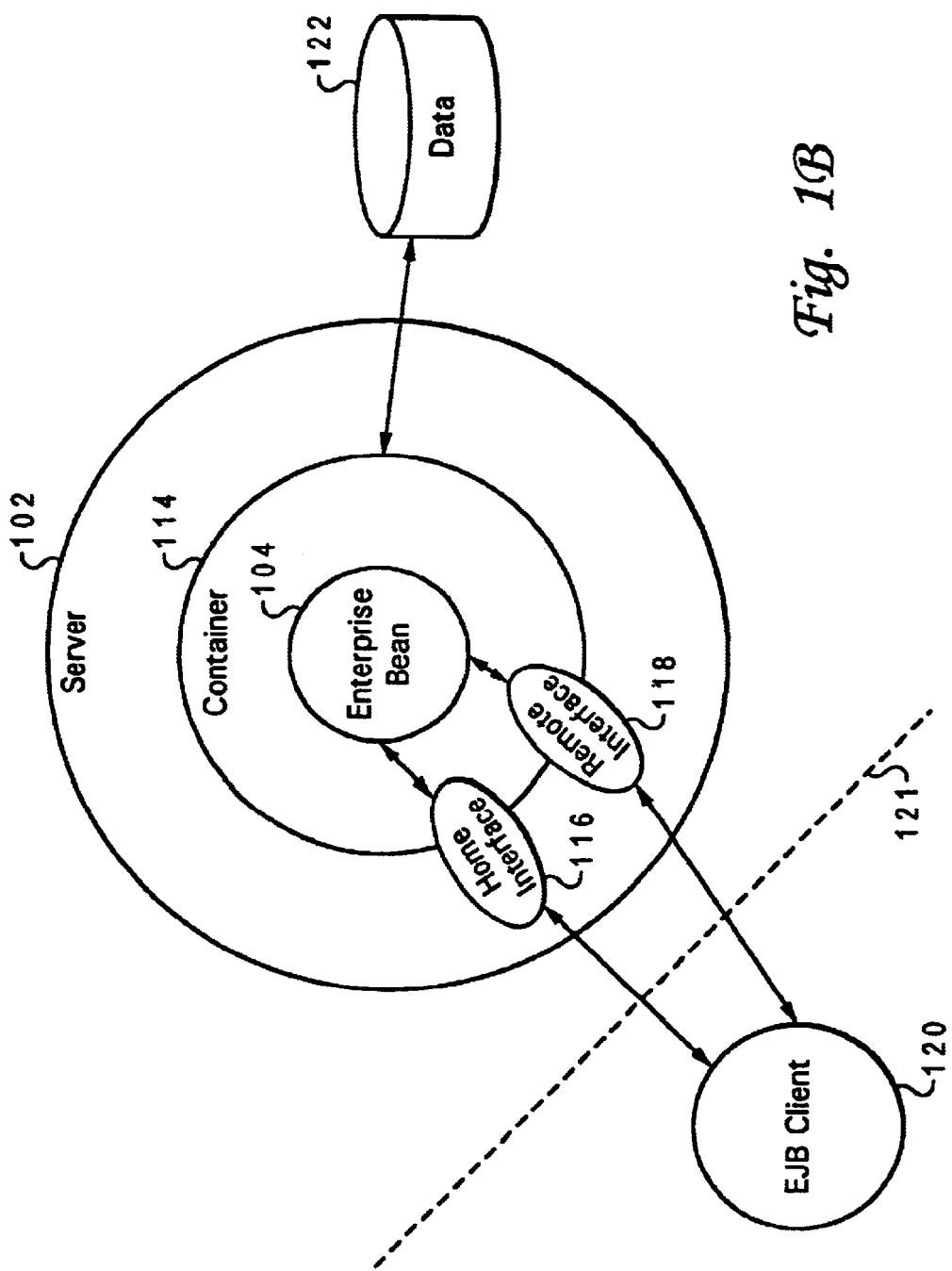
FIG. 1B is a high-level block diagram of operation of an Enterprise Java bean in accordance with the present invention.

Referring to FIG. 1B, a high-level block diagram of operation of an Enterprise Java bean in accordance with the present invention, is illustrated. Client 120 is a Java compliant program originating on a data processing system that is typically remote from the server. Container 114 is the interface between client 120 and EJBean 104. When EJBean 104 is to be deployed (accessed by client 120), container 114 automatically produces home interface 116 and remote interface 118. Remote interface 118 provides access, by client 120, to business methods within EJBean 104. Home interface 116 identifies EJBean 104 class and is utilized to create, find and remove EJBean 104 instances. Essentially, container 114 acts as a filter and provides rules concerning transactions, state, security, etc., on all operations. Additionally, container 114 provides an interface with data sources 122, external to the container, that EJBean 104 utilizes during transactions.

Introspection is the process of discovering properties, methods and events of a component object, all the necessary information about a bean, at runtime. Introspection of an EJBean is accomplished through a set of Java's runtime classes. Java Development Kit (JDK) includes three parts: the interpreter or JVM; a runtime class library—"classes.zip", which includes all the Java runtime classes that can be used by a Java program; and a set of programming tools including the Java compiler. Introspection utilized in the present invention is part of the Java runtime class library and consists of several classes: "Class", "Method", "Field", "Array" and "Modifier". To introspect an object a call is made to retrieve information on each class. For instance, a "getClass" call is made to get the object's "Class" details. A "getMethods" call is made on the "Class" object to retrieve a "Method" object array of all the methods defined in that class. All the fields (properties) and constructors defined on that class are retrieved in a similar fashion. The process then loops through each "Method" or "Field" to get more detailed information such as method parameters and field types. The introspection classes provide the detailed information of a class and the information is utilized to verify the EJBean.

Figure 2A:
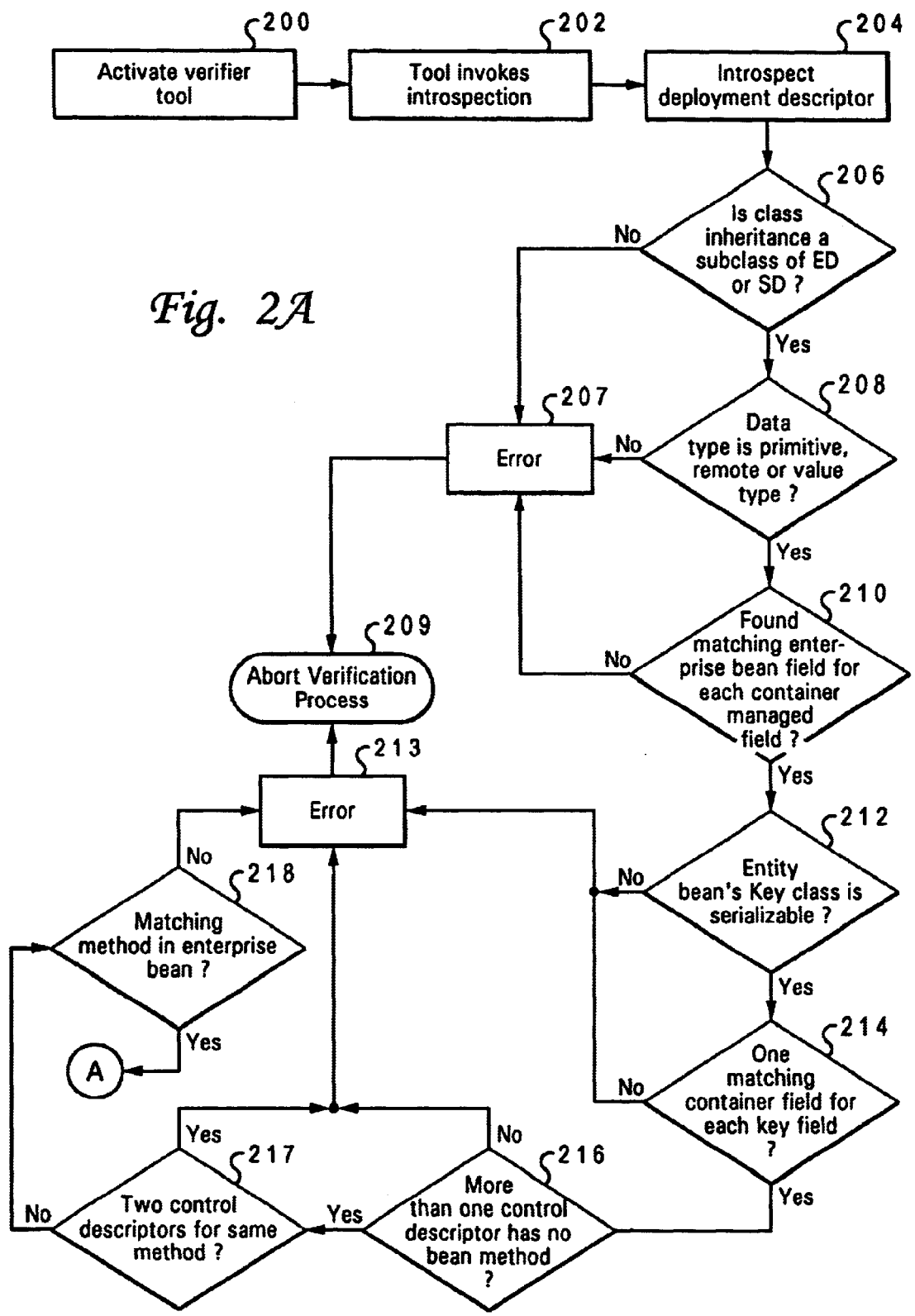
FIG. 2A depicts a high-level flow diagram for verifying Enterprise Java Beans, whether imported or developed locally, in accordance with the present invention.

Referring now to FIG. 2A, a high-level flow diagram for verifying Enterprise Java Beans, whether imported or developed locally, in accordance with the present invention is depicted. The process begins with step 200, which depicts activation of a verifier tool. The process then proceeds to step 202, which illustrates the verifier tool invoking introspection methods. The process then proceeds to step 204, which depicts a Java Development Kit introspecting a deployment descriptor of the subject EJBean. Next, the process proceeds to step 206, which is a determination of whether the class inheritance of the deployment descriptor is a subclass of either an EntityDescriptor or a SessionDescriptor (types of bean descriptors).

If the class inheritance is neither an EntityDescriptor or a SessionDescriptor the process proceeds to step 207, which depicts throwing (signaling or indicating) an error. Each error thrown is specifically determined by the verifier tool and displayedon the tool operator's terminal, thus providing efficient error discovery and thus, efficient error correction. The process then proceeds to step 209, which illustrates the verifier tool aborting the verification process. Returning to step 206, if the class inheritance is a subclass of either an EntityDescriptor or a SessionDescriptor, the process proceeds instead, to step 208, which illustrates a determination of whether data type linked to the EJBean is primitive, remote or value type.

If Container managed (CM) field's data type is neither primitive, remote nor value type, the process proceeds to step 207, which illustrates the verifier tool throwing an error. The process then proceeds to step 209, which depicts the verifier tool aborting, or stopping, the verification process. If the data type is primitive, remote or value type, the process then passes from step 208 to step 210, which illustrates determining whether each CM field has a matching EJBean field. Mapping between CM field and EJBean field is not 1:1 mapping. For each CM field there must be a EJBean field to match it, though not all EJBean fields require a matching CM field. If any CM field does not have a matching EJBean field the process proceeds to step 207, which depicts an error being thrown respective to the field mismatch. The process then proceeds to step 209, which illustrates the verifier tool stopping the verification process. Returning to step 210, if the EJBean fields and container managed fields all match, the process then proceeds to step 212, which depicts a determination of whether the entity bean key class is serializable.

If the key class is not serializable, the process moves to step 213, which illustrates an error being thrown. The process then passes to step 209, which depicts the verifier tool aborting verification. Returning to step 212, if the entity bean key class is serializable, the process then passes to step 214, which illustrates a determination of whether each key field has a matching container field. If there is a key field and container managed field mismatch, the process proceeds to step 213, which illustrates an error being thrown. Each key field requires a matching CM field, but some CM fields may not have a matching key field. The process then proceeds to step 209, which illustrates the verifier tool aborting the verification process. Returning to step 214, if each key field has a matching CM field, the process then proceeds to step 216, which illustrates a determination of whether, at most, one control descriptor has no bean method. If this is not true, the process proceeds to step 213, which illustrates an error being thrown. The process then passes to step 209 to discontinue the verification process.

Returning to step 216, if at most, only one control descriptor has no bean method, the process continues to step 217, which illustrates a determination of whether there are two control descriptors defined for the same bean method. If there are two control descriptors defined for the same bean method, the process proceeds to step 213, which depicts throwing an error. The process then passes to step 209, which illustrates the verification tool aborting the verification process. If more than one control descriptor are found for the same method, the process proceeds instead from step 217 to step 218, which depicts determining whether the descriptor method matches the method in the EJBean. If the methods don't match, an error is thrown and the process moves to step 209, where the verification tool aborts the verification process. If the descriptor method does match the method in the EJBean, the process then passes to step 230 in FIG. 2B via connector A, which illustrates beginning introspection of the EJBean remote interface.

Figure 2B:
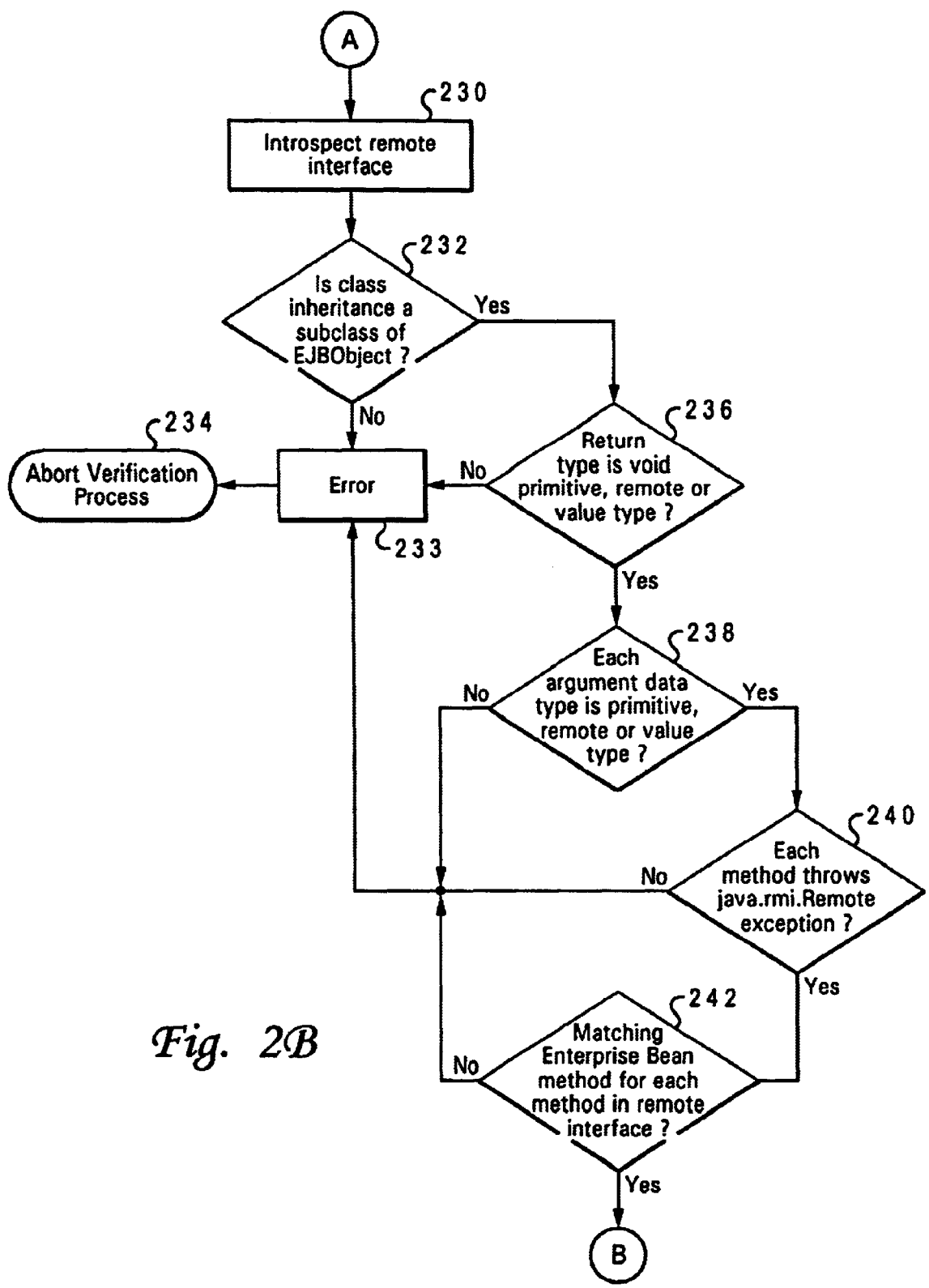
FIG. 2B is a high-level flow diagram for verifying a remote interface of an Enterprise Java Bean in accordance with the present invention.

Referring to FIG. 2B, a high-level flow diagram for verifying the remote interface of an EJBean in accordance with the present invention is illustrated. The process begins with connector A, which is a continuation of a successful verification of the deployment descriptor. The process proceeds to step 230, which depicts introspection of the remote interface. The process then passes to step 232, which illustrates a determination of whether the class inheritance is a subclass to EJBObject. If the class inheritance is not a subclass the process passes to step 233, which depicts an error being thrown. Process then passes to step 234, which illustrates the verification tool aborting the verification process.

Returning to step 232, if class inheritance is a subclass of EJBObject, the process instead proceeds to step 236, which depicts a determination of whether the method returned type is void, primitive, remote or value type. If the return type is not void, primitive, remote or value type, the process proceeds to step 233, which depicts an error being thrown. The process then passes to step 234, which depicts the verification tool aborting the verification process. Returning to step 236, if the Return type is void, primitive, remote or value type, the process instead proceeds to step 238, which illustrates a determination of whether each argument data type is primitive, remote or value type. If any argument data type is not primitive, remote or value type, the process proceeds to step 233, which depicts an error being thrown. The process then proceeds to step 234 which illustrates the verification tool aborting the verification process. Returning to step 238, if each data type is primitive, remote or value type, the process then passes to step 240, which depicts a determination of whether each remote interface method throws a java.rmi.RemoteExceltion. If any remote interface method does not throw the java.rmi.RemoteException, the process passes to step 233, which illustrates throwing an error. The process then proceeds to step 234, which depicts the verification tool aborting the verification process. If, in step 240, the determination is made that each method does throw a java.rmi.RemoteException, the process instead proceeds to step 242, which illustrates a determination of whether there is a matching EJBean method for each method in the remote interface. Each method in the remote interface must have a matching bean method, but the bean method is not required to match up with the remote interface method. If each method in the remote interface does not match each EJBean method, the process passes to step 233, which depicts an error been thrown. The process then continues to step 234, which illustrates discontinuing the verification process. If the determination is made that each method in the remote interface has a matching EJBean method, the process instead passes to step 250 in FIG. 2C via connector B to begin a verification process for the home interface.

Figure 2C:
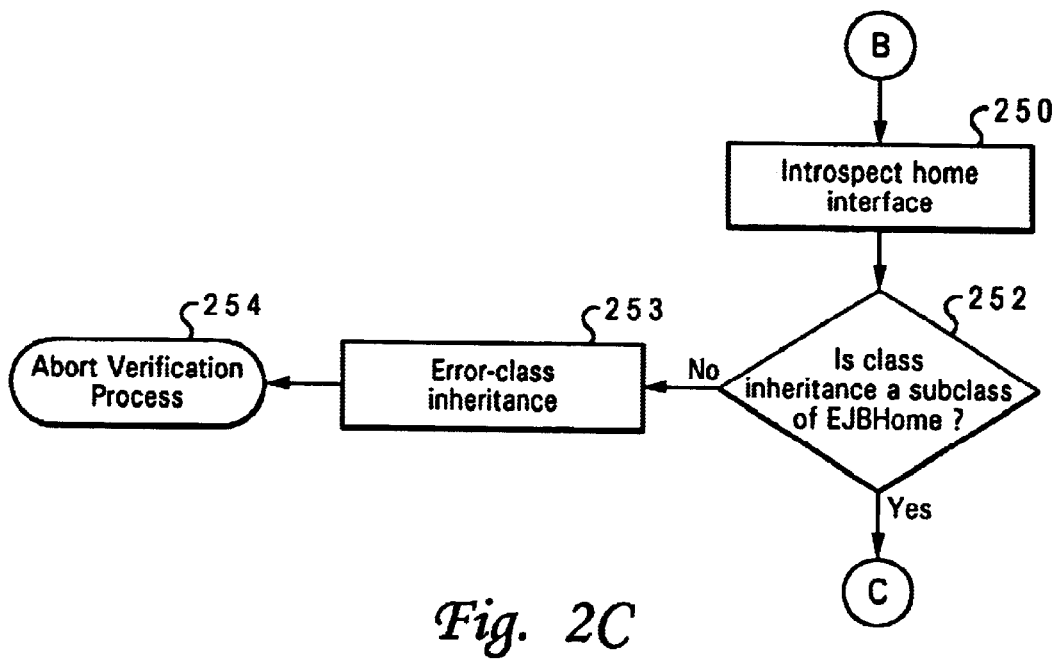
FIG. 2C depicts a high-level flow diagram for verifying validity of a home interface of an Enterprise Java Bean in accordance with the present invention.

Referring now to FIG. 2C, a high-level flow diagram for verifying validity of a home interface for an Enterprise Java Bean in accordance with the present invention is depicted. Beginning with connector B, following a successful verification of the remote interface, the process moves to step 250, which depicts the verifier tool beginning introspection of the home interface. The process passes to step 252, which illustrates a determination of whether EJBean's home interface class inheritance is a subclass of EJBHome. If the class inheritance is not a subclass of EJBHome, the process proceeds to step 253, which depicts an error regarding class inheritance being thrown. The process then passes to step 254, which illustrates the verification tool aborting the verifications process. If it is determined that the class inheritance is a subclass of EJBHome, the processpasses instead to step 260 in FIG. 2D, via connector C.

Figure 2D:
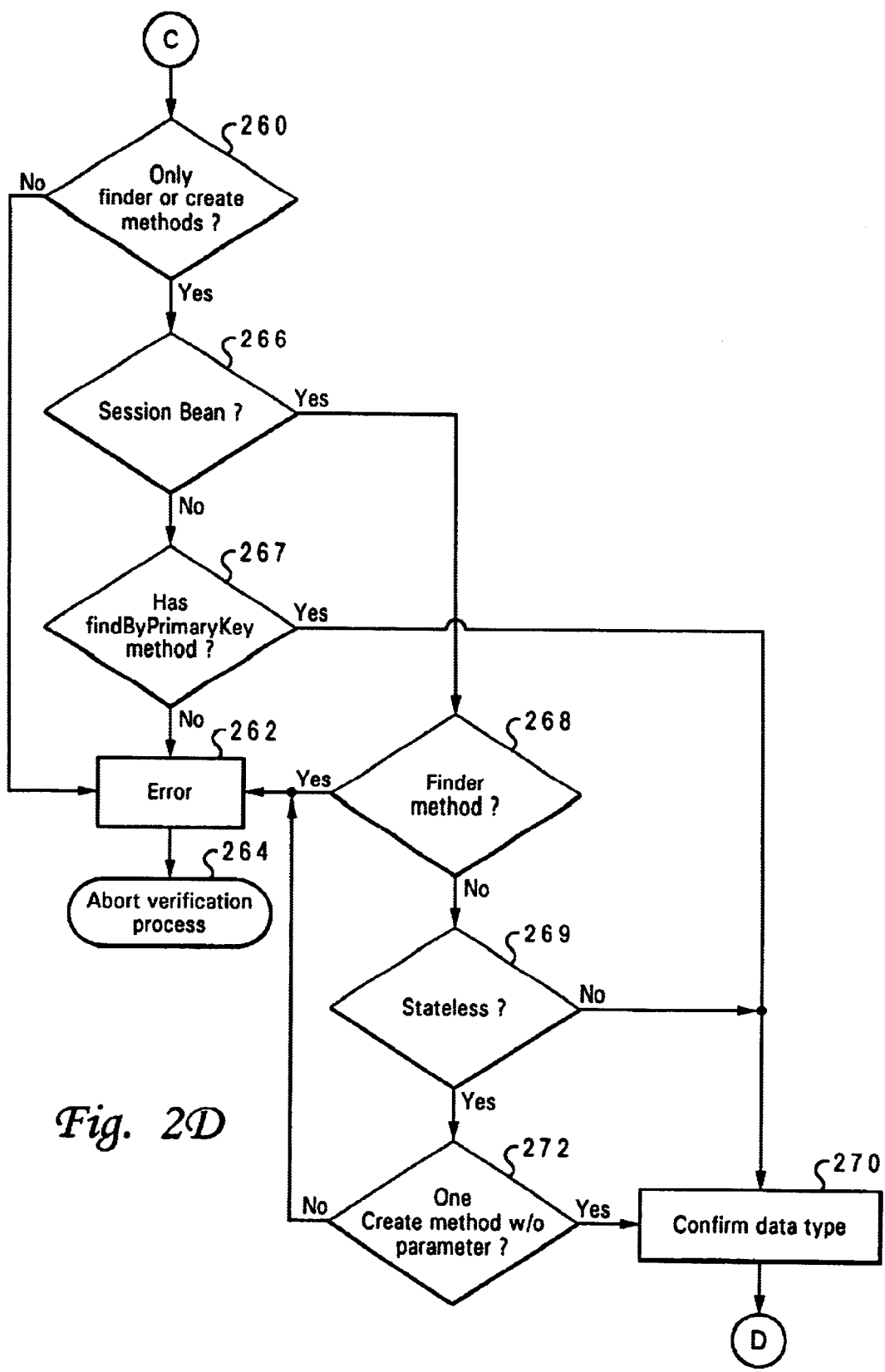
FIG. 2D illustrates a high-level flow diagram for verifying validity of the home interface of an Enterprise Java Bean in accordance with the present invention is continued from FIG. 2C.

Referring now to FIG. 2D, a high-level flow diagram for verifying validity of the home interface of an Enterprise Java Bean in accordance with the present invention is continued from FIG. 2C. The process moves from connector C to step 260, which depicts a determination of whether the EJBean has only finder or create methods. If not, the process proceeds to step 262, which illustrates an error being thrown. The process then passes to step 264, which illustrates aborting the verification process. Arguments of each finder methodare used by entity bean implementation to locate requested entity objects. Arguments of the create methods are typically used to initialize the state of a created entity object and the return type of a create method is the entity bean's remote interface. The throws clause of every finder and create method includes java.rmi.RemoteException, javax.ejb.FinderException or javax.ejb.CreateException.

Returning to step 260, if there are only finder or create methods, the process then passes to step 266, which depicts a determination of whether the EJBean is a session bean. If the EJBean is a session bean, the process proceeds to step 268.

Returning to step 266, if the determination is made that the EJBean is not a session bean, the process instead proceeds to step 267, which illustrates a determination of whether a findByPrimaryKey method is present. If the findByPrimaryKey (allows a client to locate an entity object using a primary key; return type is Entity bean's remote interface) method is present, the process passes to step 270 which depicts confirming the data type. The process then continues, via connector D to steps 274 and 278 in FIG. 2E. If there is no findByPrimaryKey method, the process passes from step 267 to step 262, which depicts an error being displayed/thrown. Next the process continues to step 264, which illustrates the verification tool discontinuing the verification process.

Returning to step 268, if the determination is made that there is no finder method present, the process passes instead to step 269, which illustrates a determination of whether the EJBean is a stateless session bean. If the EJBean is determined not to be stateless, the process proceeds to step 270, which depicts confirming the data type. If the EJBean is determined to be stateless, the process instead proceeds to step 272, which depicts a determination of whether there is "one create method without parameter" present. If not, the process moves to step 262, which illustrates an error being thrown. The process then passes to step 264, which depicts discontinuing the verification process. If the one create method without parameter is present, the process instead proceeds to step 270, which illustrates confirming the data type. The verification process then proceeds to step 274 in FIG. 2E via connector D.

Figure 2E:
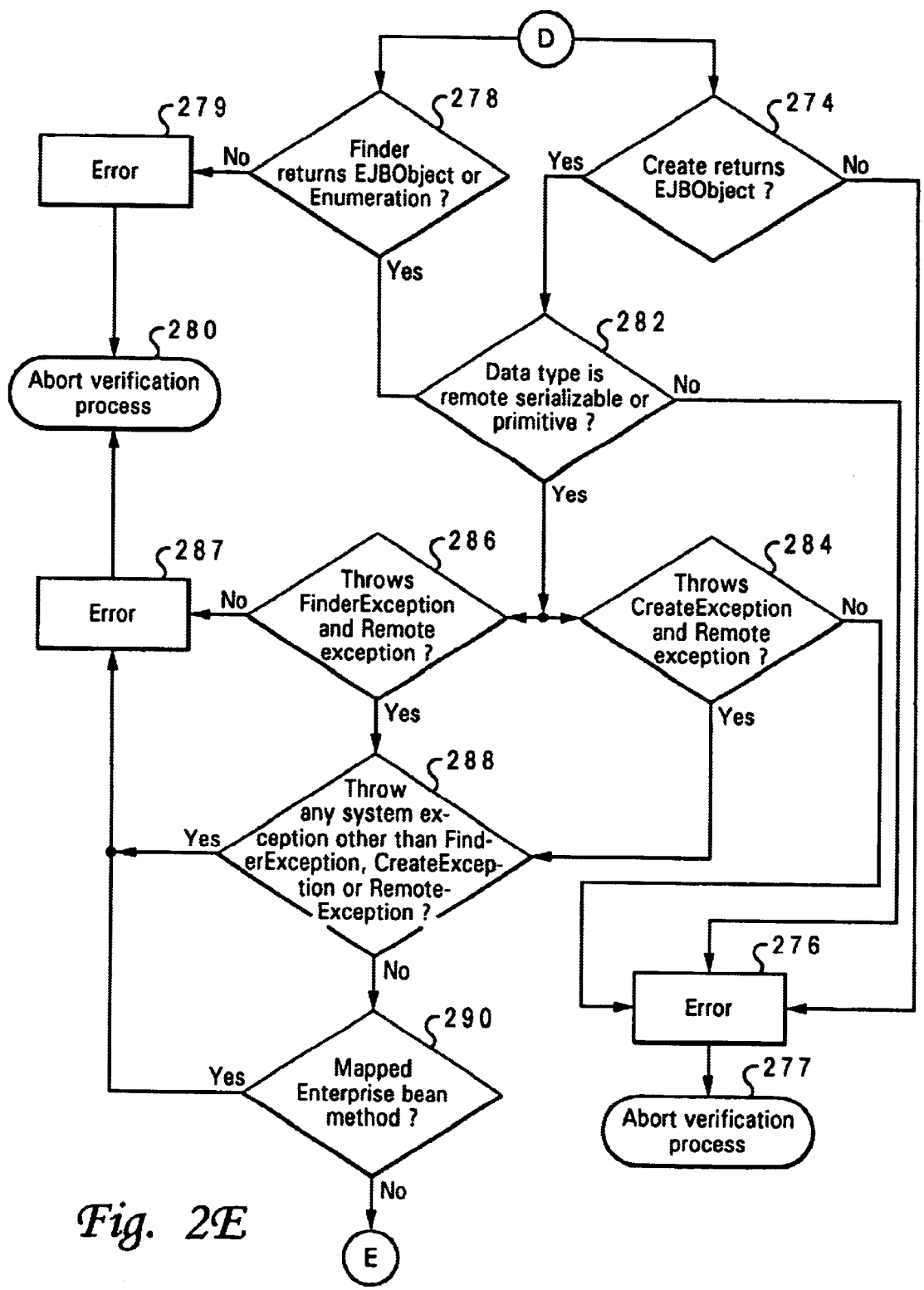
FIG. 2E illustrates a high-level flow diagram for verifying validity of the home interface of an Enterprise Java Bean in accordance with the present invention is continued from FIG. 2D.

Referring to now FIG. 2E, a high-level flow diagram for verifying validity of the home interface of an Enterprise Java Bean in accordance with the present invention is continued from FIG. 2D. Continuing from FIG. 2D via connector D, the process proceeds to step 274, which depicts a determination of whether the create method returns EJBObject (class instance that implements the EJBean's remote interface). If not, the process passes to step 276, which illustrates an error being thrown/displayed. The process continues to step 277, which illustrates the verification tool aborting the verification process. If, in step 274, Create method returns EJBObject, the process proceeds instead to step 282, which depicts a determination of whether the parameter's data type is remote, value type or primitive. If the parameter's data type is not remote, value type or primitive, the process passes to step 276, which illustrates an error being returned and the process continues to step 277, which depicts discontinuation of the verification process.

Returning to connector D, concurrently with step 274, the process passes to step 278, which depicts a determination of whether the Finder method returns either EJBobject or Enumeration. If not, the process passes to step 279, which illustrates an error being thrown by the process. The process then passes to step 280, which depicts discontinuing the verification process. If the Finder method does return EJBObject or Enumeration in step 278, the process instead proceeds to step 282, where a determination is made whether the parameter's data type is remote, value type or primitive. If not, the process passes to step 276, which illustrates an error being thrown by the process. The IS process then continues to step 277, signifying that the verification process is discontinued.

Returning to step 282, if both the Finder method and the Create method have a correct return type and the parameter's data type is remote, value type or primitive, the process proceeds to step 284 and 286 simultaneously. Step 284, illustrates whether a create method of the EJBean's remote interface throws CreateException and Remote exception. A create method must throw CreateException and remote exception. Create methodmay also throw user defined exceptions, but not any other system exceptions. If not, the process passes to step 276, which depicts an error being thrown. The process then continues to step 277, which illustrates discontinuation of the verification process.

If the home's create method throws CreateException and RemoteException, the process proceeds instead to step 288, which depicts a determination of whether the finder and create method is throwing any system exception other than remote, finder or create. No other system exception may be thrown unless the exception is a remote exception, create exception or finder exception. If the determination is made that a system exception other than a remote, create or finder exception is thrown, the process passes to step 287, which illustrates an error being thrown. The process continues to step 280, which depicts the verification process being discontinued.

If the determination is made that the only system exception thrown is either a remote, create or finder exception, the process proceeds instead, to step 290, which illustrates a determination of whether the EJBean method is mapped. If not, the process passes to step 287, which illustrates an error being thrown. Next, the process passes to step 280, which depicts discontinuing the verification process. At the same time that the determination is being made on whether the CreateFinder method throws CreateException and RemoteException, the process concurrently passes to step 286, which illustrates determination of whether the finder method throws FinderException and RemoteException If not, the process moves to step 287, which depicts throwing an error. The process then proceeds to step 280, which illustrates discontinuation of the verification process.

Returning to step 286, if the determination is made that the home's finder method throws FinderException and RemoteException, the process proceeds instead to step 288, which depicts a determination of whether the finder and create method is throwing any other system exception. If not, the process passes to step 287, which depicts throwing an error and continues to step 280, which illustrates discontinuing the verification process. If the determination is made that a system exception other than a remote, create or finder exceptionis thrown, the process passes instead to step 290, which depicts a determination of whether the EJBean method is mapped. If the EJBean is not mapped, the process passes to step 287, which illustrates throwing an error. The process continues to step 280, which depicts discontinuation of the verification process. If instead, the determination is made that the EJBean method is mapped, the process instead, proceeds to step 300, in FIG. 2F, via connector E.

Figure 2F:
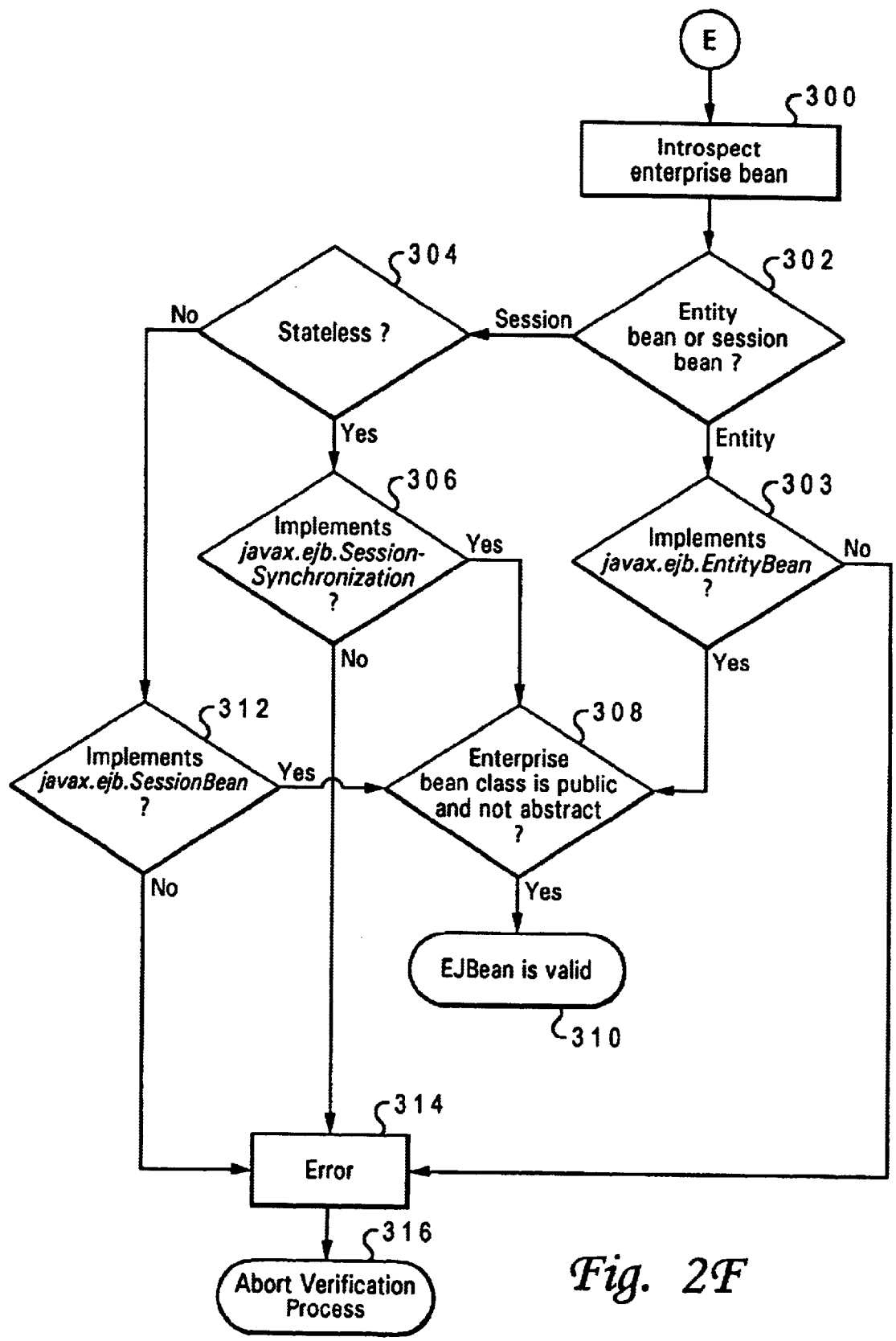
FIG. 2F depictstat high-level flow diagram for verifying validity of an Enterprise Java Bean through introspection, in accordance with the present invention.
Figure 3:
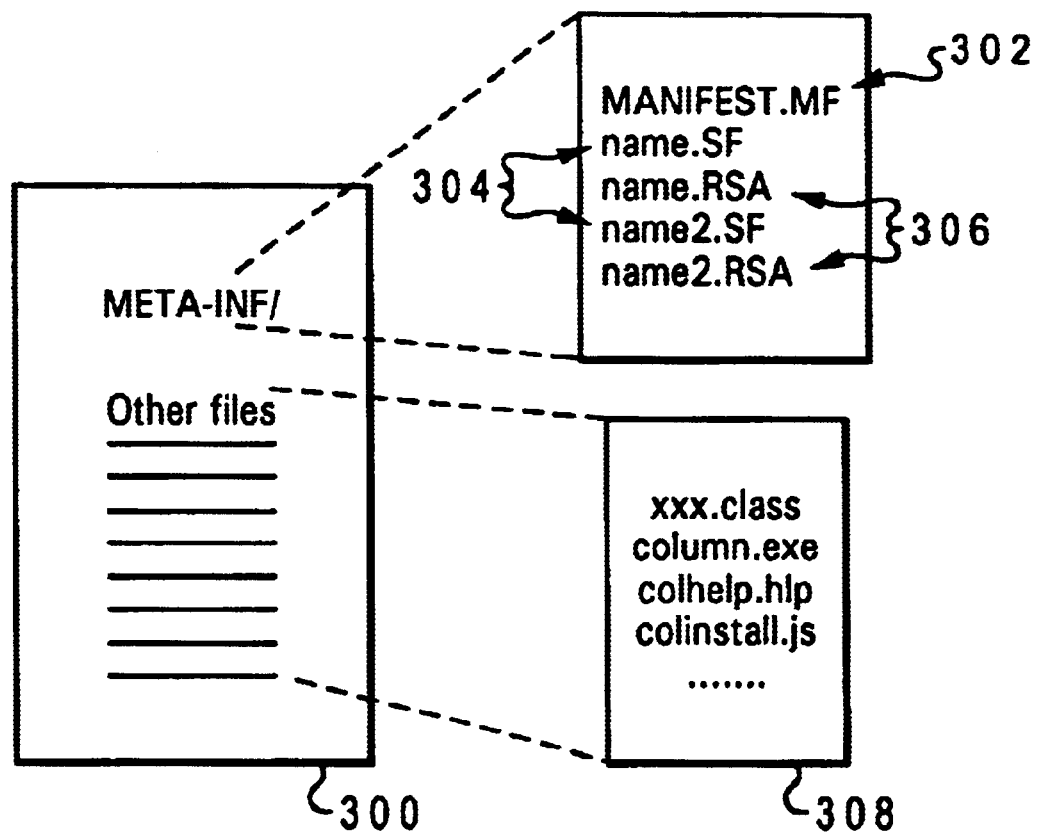
FIG. 3 illustrates a block diagram of a prior art JAR file.

Referring now to FIG. 2F, a high-level flow diagram for verifying validity of an Enterprise Java Bean through introspection in accordance with the present invention, is depicted. Beginning with connector E, the process continues to step 300, which depicts beginning introspection of the Enterprise Java bean utilizing the JAR files of the bean. The process passes to step 302, which illustrates a determination of whether the bean is an entity bean or a session bean. If the bean is an entity bean, the process proceeds to step 303, which depicts a determination of whether the entity bean implements javax.ejb.EntityBean. If not the process proceeds to step 314, which illustrates an error being thrown and the process continues to step 316, which depicts the verification tool aborting the verification process. If the Entity bean implements javax.ejb.EntityBean, the process proceeds instead to step 308, which illustrates a determination that the EJBean class is public and not abstract. The process then passes to step 310, which depicts confirmation of the validity of the Enterprise Java Bean.

Returning to step 302, if the determination is made that the EJBean is a session bean, the process passes to step 304, which depicts a determination of whether the session bean is stateless or not. If the session bean is stateless, the process passes to step 306, which illustrates a determination of whether the bean implements javax.ejb.SessionSynchronization (provides session bean instances with transaction synchronization interface). If javax.ejb.SessionSynchronization is implemented, the process proceeds to step 308, which depicts a determination that the EJBean class is public and not abstract. The process continues to step 310, which illustrates verifidation of the Enterprise Java Bean as valid. If javax.ejb.SessionSynchronization is not implemented the process proceeds instead, to step 314, which depicts the verification process throwing an error. The process then continues to step 316, which illustrates discontinuing the verification process.

Returning to step 304, if the Enterprise Java Bean is determined not to be stateless, the process proceeds instead to step 312, which depicts a determination of whether the session bean implements javax.ejb.SessionBean. If not, the:. process passes to step 314, which illustrates an error being thrown. The process then passes to step 316, which depicts the discontinuation of the verification process. If in step 312, the session bean does implement javax.ejb.SessionBean, the process proceeds instead to step. 308, which depicts the Enterprise Java Bean class being designated as public and not abstract. The process continues to step 310, which, illustrates confirmation of the validity of the Enterprise Java Bean.

It is important to note that while the present invention has been described in the context of a fully functional data processing system and/or network; those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and.transmission type mediums such as digital and analog communication links.

An exemplary set of instructions for determining validity of an Enterprise Java Bean in accordance with the preferred embodiment is shown below. It should be understood by those skilled in the art that changes in structure and order of the compilation may be made without altering the scope and spirit of the embodiment.

```
package com.ibm.ejb.cb.emit.cb import javax.ejb.deployment.DeploymentDescriptor;
import javax.ejb.deployment.EntityDescriptor;
import javax.ejb.deployment.ControlDescriptor;
import javax.ejb.deployment.SessionDescriptor;
import com.ibm.ejb.cb.util.JarManipulator;
import com.ibm.beans.util.MessageFormatter;
import java.lang.reflect.Field;
import java.lang.reflect.Modifier;
import java.lang.reflect.Method;
import java.lang.RuntimeException;
import java.lang.Class;
import java.lang.reflect.Modifier;
public class EJBVerify
{
    protected final static int FIELD_TYPE = 0;
    protected final static int RETURN_TYPE = 1;
    protected final static int PARAMETER_TYPE = 2;
    protected DeploymentDescriptor dd;
    protected Class ejbObject;
    protected Class ejbHome;
    protected Class ejbBean;
    protected Class ejbKey;
    protected boolean isEntity;
    protected boolean isCMEB;
    protected boolean isStatelessSessionBean;
    MessageFormatter mf;
    protected String error;
    public EJBVerify( )
    {
    }
    public EJBVerify (DeploymentDescriptor __dd)
    {
        initialize (__dd) ;
    }
    public void initialize(DeploymentDescriptor __dd)
    {
        dd = __dd;
        mf = new MessageFormatter(
            "com.ibm.ejb.cb.emit.cb.EJBDeployResourceBundle");
        try
        {
            ejbObject =
Class.forName(dd.getRemoteInterfaceClassName ( ));
            ejbHome =
Class.forName(dd.getHomeInterfaceClassName ( ));
            ejbBean =
Class.forName(dd.getEnterpriseBeanClassName ( ));
            isEntity = false;
            isCMEB = false;
            if (dd instanceof
javax.ejb.deployment.EntityDescriptor)
            {
                isEntity = true;
                Field fields[ ]=
((EntityDescriptor)dd).getContainerManagedFields( );
                if (fields != null && fields.length > 0)
                    iSCMEB = true;
                ejbKey = Class.forName(
((EntityDescriptor)dd).getPrimaryKeyClassName( ));
            }
            else
                isStatelessSessionBean =
(((SessionDescriptor)dd).getStateManagementType ( ) ==
                            SessionDescriptor.STATELESS_SESSION);
            if(isEntity)
            {
                if(isCMEB)
System.out.println(mf.format("INFO_VFY_VCMEB",
                    dd.getRemoteInterfaceClassName( )));
                else
System.out.println(mf.format("INFO_VFY_VBMEB",
                    dd.getRemoteInterfaceClassName( )));
            }
            else
                System.out.println(mf.format("INFO_VFY_VSB",
                    dd.getRemoteInterfaceClassName( )));
        }
```

-continued package com.ibm.ejb.cb.emit.cb

```
        catch(Exception e)
        {
           e.printStackTrace( );
           throw new RuntimeException("cannot load EJB
classes");
        }
     }
     public synchronized void verifyAll( ) throws
RuntimeException
     {
        error = " ";
        verifyDeploymentDescriptor( );
        verifyEJBObject( );
        verifyEJBHome( );
        verifyBean( );
        foundError( );
     }
     protected void foundError( )
     {
        if(error.length( ) > 0)
           throw new RuntimeException(error);
     }
     protected void verifyDeploymentDescriptor( )
     {
        Field[ ] fields = null;
        if (dd instanceof
javax.ejb.deployment.EntityDescriptor)
        {
if(!java.io.Serializable.class.isAssignableFrom(ejbKey))
           error += mf.format("ERROR_VFY_KEYNOTSER",
ejbKey.getName( ));
           // make sure all container managed fields are
serializable
           fields =
((EntityDescriptor)dd).getContainerManagedFields( );
           if (fields != null && fields.length > 0)
           {
              for (int i = 0; i < fields.length; i++)
              {
                 if(!checkDataType(fields[i].getType( ),
FIELD_TYPE))
                    error += inValidCMFieldTypeMsg(fields [i]);
              }
              checkMatchingBeanField(fields);
              checkMatchingKeyField(fields)
           }
        }
        verifyControlDescriptors( );
     }
     protected void checkMatchingBeanField(Field[ ] cmFields)
     {
        Field beanFlds[ ];
        try
        {
           beanFlds = ejbBean.getFields( );
        }
        catch(Exception e)
        {
           e.printStackTrace( );
           throw new RuntimeException("Cannot get all the bean
field");
        }
        if(beanFlds == null || beanFlds.length < 1)
        {
           error += mf.format("ERROR_VFY_NOBEANFLD",
ejbBean.getName( ));
           return;
        }
        for(int i = 0; i < cmFields.length; i++)
        {
           int j;
           for(j = 0; j < beanFlds.length; j++)
           {
              if(fieldEquals(cmFields[i], beanFlds[j]))
              {
                 if(!Modifier.isPublic(
                    beanFlds[j].getModifiers( )))
```

-continued package com.ibm.ejb.cb.emit.cb

```
                    error +=
mf.format("ERROR_VFY_NOUPUBMATFLD",
                                          cmFields[i].getName( ));
                 break;
              }
           }
           if(j == beanFlds.length)
              error += mf.format("ERROR_VFY_NOMATFLD",
cmFields[i].getName( ));
        }
     }
     protected void checkMatchingKeyField(Field[ ] cmFields)
     {
        Field keys[ ];
        try
        {
           keys = ejbKey.getFields( );
        }
        catch(Exception e)
        {
           e.printStackTrace( );
           throw new
RuntimeException(mf.format("ERROR_VFY_LOADKEYFLD",
                 ejbKey.getName( )));
        }
        if(keys.length < 1)
        {
           error += mf.format("ERROR_VFY_NOKEYFLD",
ejbKey.getName( ));
           return;
        }
        for (int i = 0; i < keys.length; i++)
        {
           int modif = keys[i].getModifiers( );
           if(Modifier.isFinal(modif) &&
Modifier.isStatic(modif))
              continue;
           int j = 0;
           for (j = 0; j < cmFields.length; j++)
           {
              if(fieldEquals(keys[i], cmFields[j]))
                 break;
           }
           if(j == cmFields.length)
           {
              error += mf.format("ERROR_VFY_NOMATKEYFLD",
keys[i].getName( ));
           }
        }
     }
     protected void verifyControlDescriptors( )
     {
        String error = " ";
        ControlDescriptor cds[ ] = dd.getControlDescriptors( );
        if (cds != null && cds.length > 0)
        {
           boolean foundbcd = false;
           Method bms[ ] = getClassMethods(ejbBean);
           for(int i = 0; i < cds.length; i++)
           {
              Method m = cds[i].getMethod( );
              if(m == null)
              { // make sure only have one bean level Control
Descriptor
                 if(foundbcd)
                    error += mf.format("ERROR_TWODEFCTLDES",
ejbObject.getName( ));
                 else
                    foundbcd = true;
                 continue;
              }
              for(int j= 0; j < cds.length; j++)
              {
                 if(i != j && cds[j].getMethod( ) != null &&
                    methodEquals(m, cds[j].getMethod( )))
                 {
                    error +=
```

-continued package com.ibm.ejb.cb.emit.cb

```
mf.format("ERROR_VFY_TWOCTLDESMTD", m.getName( ));
            break;
        }
    }
//make sure there is an associated method for
each per method
        //control descriptor
        if(bms == null || bms.length == 0)
        {
            error +=
mf.format("ERROR_VFY_NOMTACTLDESMTD", m.getName( ));
            continue;
        }
        else
        {
            int j = 0;
            for(j = 0; j < bms.length; j++)
            {
                if(bms[j].equals(m))
                    break;
            }
            if(j == bms.length)
                error +=
mf.format("ERROR_VFY_NOMTACTLDESMTD", m.getName( ));
        }
    }
}
protected void verifyEJBObject( )
{
    // make sure it is a subclass of EJBObject
    if
(!javax.ejb.EJBObject.class.isAssignableFrom(ejbObject))
    {
        error += mf.format("ERROR_VFY_NOEJBOBJECT",
ejbObject.getName( ));
    }
    Method bms[ ] = getClassMethods(ejbBean);
    verifyEJBObjectMethods(ejbObject, bms);
}
protected void verifyEJBObjectMethods(Class ejbObj,
Method bms[ ])
{
    verifyClassName(ejbObj);
    Method ms [ ] = ejbObj.getDecLareMethods ( );
    if (ms == null) {
        error += mf.format("ERROR_VFY_OBJDECMETHOD",
ejbObj.getName( ));
        foundError( );
    }
    else
    {
        for(int i = 0; i< ms.length; i++)
            verifyEJBObjectMethod(ms [i], bms, ejbObj);
        Class parents[ ] = ejbObj.getInterfaces( );
        if(parents != null && parents.length > 0)
        {
            for(int i = 0; i < parents.length; i++)
            {
if(parents[i].equals(javax.ejb.EJBObject.class) ||
                parents[i].equals(java.rmi.Remote.class))
                    continue;
                if(isRemoteInterface(parents[i]))
                    verifyEJBObjectMethods(parents[i], bms);
                else
                {
                    error += "EJB Remote interface " +
ejbObj.getName( ) +
                        " has a parent interface " + parents[i]
+
                        " which is not a remote interface.";
                }
            }
        }
    } // end else
}
protected void verifyEJBObjectMethod(Method m, Method[ ]
```

-continued package com.ibm.ejb.cb.emit.cb

```
bms,
            Class ejbObj)
{
    boolean foundMatching = false;
    verifyEJBObjectMethodName(m.getName( ));
    if(bms != null && bms.length > 0)
    {
        for(int j = 0; j < bms.length; j++)
            if(methodEquals(m, bms[j]) &&
                Modifier.isPublic(bms[j].getModifiers( )) &&
                (!Modifier.isAbstract(bms[j].getModifiers( ))))
            {
                foundMatching = true;
                break;
            }
    }
    if(!foundMatching)
        error += mf.format("ERROR_VFY_OBJNOMATBEANMTD",
m.getName( ));
    }
    if(!checkDataType(m.getReturnType( ), RETURN_TYPE))
    {
        error += mf.format("ERROR_VFY_OBJWRONGRTN",
m.getName( ));
    }
    Class paras[ ] = m.getParameterTypes( );
    if(paras != null && paras.length > 0)
    {
        for(int j = 0; j < paras.length; j++)
            if(!checkDataType(paras[j], PARAMETER_TYPE))
            {
                error += mf.format("ERROR_VFY_OBJWRONGPARA",
                    paras[j].toString( ), m.getName( ));
            }
    }
}
public static final int METHOD_COUNT = 0;
public static final int FBPK_METHOD_COUNT = 1;
public static final int CREATE_METHOD_COUNT = 2;
protected void verifyEJBHome( )
{
    if
(!javax.ejb.EJBHome.class.isAssignableFrom(ejbHome))
    {
        error += mf.format("ERROR_VFY_NOEJBHOME",
ejbHome.getName( ));
    }
    int rtn[ ] = new int[3];
    rtn[EJBVerify.METHOD_COUNT] = 0;
    rtn[EJBVerify.FBPK_METHOD_COUNT] = 0;
    rtn[EJBVerify.CREATE_METHOD_COUNT] = 0;
    verifyEJBHomeMethods(ejbHome, rtn, null);
    if(rtn[EJBVerify.METHOD_COUNT] == 0)
    {
        error += mf.format("ERROR_VFY_HMNOMTD",
ejbHome.getName( ));
    }
    if (rtn[EJBVerify.FBPK_METHOD_COUNT] == 0 && isEntity)
    {
        error += mf.format("ERROR_VFY_FBPMTD",
ejbObject.getName( ));
    }
    if (!isEntity)
    {
        if (rtn[EJBVerify.CREATE_METHOD_COUNT] == 0)
            error += mf.format("ERROR_VFY_CREMTD",
ejbObject.getName( ));
    }
}
protected Method verifyEJBHomeMethods(Class home, int
rtn[ ],
            Method slsbMethod)
{
    verifyClassName(home);
    Method[ ] homeMethods = home.getDeclareMethods( );
    if (homeMethods == null) {
        error += mf.format("ERROR_VFY_HMDECMETHOD",
```

-continued package com.ibm.ejb.cb.emit.cb

```
home.getName( ));
        foundError( );
    }
    else
    {
    rtn[EJBVerify.METHOD_COUNT) += homeMethods.length;
    for (int i = 0; i < homeMethods.length; i++)
        slsbMethod = verifyEJBHomeMethod(homeMethods[i],
rtn, slsbMethod);
        Class parents[ ] = home.getInterfaces( );
        if(parents != null && parents.length > 0)
        {
            for(int i = 0; i < parents.length; i++)
            {
                if(parents[i].equals(javax.ejb.EJBHome.class)
||
                    parents[i].equals(java.rmi.Remote.class))
continue;
                if(isRemoteInterface(parents[i]))
                    slsbMethod =
verifyEJBHomeMethods(parents[i],
                            rtn, slsbMethod);
                else
                {
                    error += "EJB home interface " +
ejbHome.getName( ) +
                        " has a parent interface " + parents[i]
+
                        " which is not a remote interface.";
                }
            }
        }
        return slsbMethod;
    }
    protected Method verifyEJBHomeMethod(Method homeMethod,
int rtn[ ],
            Method slsbMethod)
    {
        String homeMethodName = homeMethod. getName( );
        Class[ ] homeMethodParms =
homeMethod.getParameterTypes( );
        Class homeMethodRetVal = homeMethod.getReturnType( );
        if (!homeMethodName.startsWith("find") &&
            !homeMethodName.equals("create"))
        {
            error += mf.format("ERROR_VFY_NOFNDCREMTD",
homeMethod.getName( ));
        } else if (homeMethodName.startsWith("find") &&
!isEntity)
        {
            error += mf.format("ERROR_VFY_HMNOCRE",
homeMethod.getName( ), ejbObject.getName( ));
        }
        else if (homeMethodName.equals ("findByPrimaryKey"))
        {
            if(homeMethodParms[0] != null &&
homeMethodParms.length == 1 &&
                homeMethodParms [0].getName( ).equals(
((EntityDescriptor)dd).getPrimaryKeyClassName( )))
            {
                rtn[EJBVerify.FBPK_METHOD_COUNT] += 1;
            }
        }
        else if (!isEntity)
        {
            if(isStatelessSessionBean &&
                    (homeMethodParms.length != 0))
            {
                error += mf.format("ERROR_VFY_HMSLSCREMTD",
homeMethod.getName( ));
            }
            else if(slsbMethod != null)
            {
                if(!methodEquals(slsbMethod, homeMethod))
                {
                    error += mf.format("ERROR_VFY_TWOCREMTD",
```

-continued package com.ibm.ejb.cb.emit.cb

```
ejbObject.getName( ));
            }
        }
        else
            slsbMethod = homeMethod;
            //session bean should have at least 1 create
            rtn[EJBVerify.CREATE_METHOD_COUNT]++;
    }
    verifyEJBHomeExceptions(homeMethod);
    if(!isCMEB ||
homeMethod.getName( ).startsWith("create"))
        verifyEJBHomeMappedBeanMethod(homeMethod);
    return slsbMethod;
}
protected void verifyEJBHomeExceptions(Method homeMethod)
{
    Class[ ] excepts = homeMethod.getExceptionTypes( );
    String homeMethodName = homeMethod.getName( );
    boolean fcExceptionFound = false;
    for (int j = 0; j < excepts.length; j++)
    {
        verifyClassName(excepts[j]);
        if (homeMethodName.equals("create") &&
javax.ejb.CreateException.class.isAssignableFrom
(excepts[j]))
            fcExceptionFound = true;
        else if (homeMethodName.startsWith ("find") &&
javax.ejb.FinderException.class.isAssignableFrom
(excepts[j]))
            fcExceptionFound = true;
        else
if(java.rmi.RemoteException.class.isAssignableFrom(excepts [j]))
            continue;
        else if(excepts[j].getName( ).startsWith("java"))
            error += mf.format("ERROR_VFY_SYSEXPT",
                homeMethodName, excepts[j].getName( ));
    }
    if (!fcExceptionFound)
    {
        if(homeMethodName.equals("create"))
            error += mf.format("ERROR_VFY_CREEXPT",
ejbObject.getName( ));
        if (homeMethodName.startsWith ("find"))
            error += mf.format("ERROR_VFY_FNDEXPT",
homeMethodName);
    }
}
protected void verifyEJBHomeMethodTypes(Method
homeMethod)
{
    Class rtn = homeMethod.getReturnType( );
    String name = homeMethod.getName( );
    if(name.startsWith("find"))
    {
        if(!rtn.equals(ejbObject) &&
            !rtn.equals(java.util.Enumeration.class))
            error += mf.format("ERROR_VFY_HMFNFRTN", name);
    }
    else
    {
        if( !rtn.equals(ejbObject))
            error += mf.format("ERROR_VFY_HMCRERTN", name);
    }
    Class paras[ ] = homeMethod.getParameterTypes( );
    if(paras == null || paras.length < 1)
        return;
    for(int i = 0; i < paras.length; i++)
    {
        checkDataTYpe(paras[i], PARAMETER_TYPE);
    }
}
protected void verifyEJBObjectMethodName(String name)
{
}
protected void verifyEJBHomeMappedBeanMethod(Method
homeMethod)
{
```

-continued package com.ibm.ejb.cb.emit.cb

```
        // verify the corresponding ejb method is in the
        // Enterprise Bean
        String homeMethodName = homeMethod.getName( );
        String ejbName = "ejb" +
homeMethodName.substring(0,1).toUpperCase( )
                                  +
homeMethodName.substring (1);
        Method[ ] beanMethods = getClassMethods(ejbBean);
        boolean foundBeanMethod = findBeanMethodThatMaps (
            ejbName, homeMethod, beanMethods);
        // Have gone through all the EnterpriseBean methods,
and couldn't
        // find a corresponding method then throw up if not
CMEB.
        if (!foundBeanMethod)
            error += mf.format("ERROR_VFY_HMBEANMTD",
homeMethodName);
    }
    protected void verifyBean( )
    {
        if
(!javax.ejb.EnterpriseBean.class.isAssignableFrom(ejbBean))
        {
            error += mf.format("ERROR_VFY_NOEB",
ejbBean.getName( ));
        }
        if(isEntity &&
!javax.ejb.EntityBean.class.isAssignableFrom(ejbBean))
        {
            error += mf.format("ERROR_VFY_NOEB",
ejbBean.getName( ));
        }
        if(isEntity &&
!javax.ejb.SessionBean.class.isAssignableFrom(ejbBean))
        {
            error += mf.format("ERROR_VFY_NOSEB",
ejbBean.getName( ));
        }
        if (!isEntity)
        {
            if (isStatelessSessionBean &&
(javax.ejb.SessionSynchronization.class.isAssignabieFrom(ejb
Bean)))           error += mf.format("ERROR_VFY_NOSS",
ejbBean.getName( ));
        }
        int mod = ejbBean.getModifiers( );
        if(!java.lang.reflect.Modifier.isPublic(mod))
            error += mf.format("ERROR_VFY_NOPUBBEAN",
ejbBean.getName( ));
        if(java.lang.reflect.Modifier.isAbstract(mod))
            error += mf.format("ERROR_VFY_ABSBEAN",
ejbBean.getName( ));
        Method[ ] objMethods = getClassMethods(ejbBean);
        if (objMethods == null || objMethods.length < 1)
        {
            error += mf.format("ERROR_VFY_NOMTDBEAN",
ejbBean.getName( ));
        }
        for (int i = 0; i < objMethods.length; i++)
        {
            String objMethodName = objMethods[i].getName( );
            Class[ ] excepts = objMethods[i].getExceptionTypes( );
            for (int j=0; j < excepts.length; j++)
                verifyClassName(excepts[j]);
        }
    }
    protected void verifyClassName(Class cls)
    {
    }
    protected boolean checkDataType(Class javaType, int
typeFor)
    {
        if(EJBVerify.RETURN_TYPE == typeFor &&
                javaType.toString( ).equals("void"))
            return true;
if(java.io.Serializable.class.isAssignableFrom(javaType))
            return true;
```

-continued package com.ibm.ejb.cb.emit.cb

```
        if(javaType.isPrimitive( ))
            return true;
        if(typeFor != EJBVerify.FIELD_TYPE &&
            isRemoteInterface(javaType))
            return true;
        return false;
    }
    private boolean findBeanMethodThatMaps (String mName,
                                             Method homeMethod,
                                             Method [ ] beanMethods)
    {
        boolean foundBeanMethod = false;
        boolean bmeb = isEntity && !isCMEB;
        for (int j = 0; j<beanMethods.length; j++)
        {
            // Only bother to check for public methods
            if (!java.lang.reflect.Modifier.isPublic
                    (beanMethods[j].getModifiers( )))
                continue;
            if (java.lang.reflect.Modifier.isAbstract
                    (beanMethods[j].getModifiers( )))
                continue;
            String beanMethodName = beanMethods[j].getName( );
            Class[ ] beanMethodParms =
beanMethods[j].getParameterTypes( );
            Class beanMethodRetVal =
beanMethods[j].getReturnType( );
            Class [ ] homeMethodParms =
homeMethod.getParameterTypes( );
            String homeMethodName = homeMethod.getName( );
            if ((homeMethodParms.length ==
beanMethodParms.length) &&
                    beanMethodName.equals (mName) )
            {
                // check for the correct return type on the
EnterpriseBean
                // method of ejbCreate
                if (homeMethodName.equals("create") &&
                        (!mName.startsWith ("ejbPostCreate")))
                {
                    if(bmeb &&
!(beanMethodRetVal.getName( ).equals((
(EntityDescriptor)dd).getPrimaryKeyClassName( ))))
                        error += mf.format("ERROR_VFY_BNCRERTNPK",
ejbBean.getName( ),
((EntityDescriptor)dd).getPrimaryKeyClassName( ));
                    if(!bmeb &&
!(beanMethodRetVal.toString( ).equals("void")))
                        error += mf.format("ERROR_VFY_BNCRERTNVD",
ejbObject.getName( ));
                }
                if (homeMethodName.startsWith("find") && bmeb)
                {
                    if(!beanMethodRetVal.getName( ).equals(
((EntityDescriptor)dd).getPritnaryKeyClassName( )) &&
homeMethod.getReturnType( ).equals(ejbObject))
                        error += mf.format("RROR_VFY_BNFNDRTNPK",
homeMethodName,
                            ejbBean.getName( ),
((EntityDescriptor)dd).getPrimaryKeyClassName( ));
if(!java.util.Enumeration.class.isAssignableFrom(
                        beanMethodRetVal) &&
                        java.util.Enumeration.class.equals(
                            homeMethod.getReturnType( )))
                        error +=
mf.format ("ERROR_VFY_BNFNDRTNENUMt", homeMethodName,
                            ejbBean.getName( ));
                }
                foundBeanMethod = true;
                for (int k=0; k<homeMethodParms.length; k++)
                {
                    if
(!homeMethodParms[k].equals(beanMethodParms[k]))
                    {
                        foundBeanMethod = false;
                        break;
                    }
```

-continued package com.ibm.ejb.cb.emit.cb

```
        }
        if (foundBeanMethod == true)
            return true;
        }
    } // end for
    return false;
}
public static void verifyJar(String jarName, String
ejbObjectName)
                        throws RuntimeException
{
    DeploymentDescriptor[ ] dds;
    MessageFormatter mf = new MessageFormatter(
        "com.ibm.ejb.cb.emit.cb.EJBDeployResourceBundle");
    try
    {
        JarManipulator jarM = new JarManipulator(jarName,
null);
        dds = jarM.getAllDeploymentDescriptors( );
    }
    catch(Exception e)
    {
        e.printStackTrace( );
        throw new
RuntimeException(mf.format("ERROR_VFY_JARMPT", jarName));
    }
    if(dds == null)
    {
        throw new
RuntimeException(mf.format("ERROR_VFY_NODDS", jarName));
    }
    int i, j;
    for(i = 0; i < dds.length; i++)
    {
        if(ejbObjectName == null || ejbObjectName.equals(
            dds[i].getRemoteInterfaceClassName( )))
        {
            EJBVerify ejbv = new EJBVerify(dds[i]);
            ejbv.verifyAll( );
            if(ejbObjectName != null)
                break;
        }
    }
    if(ejbObjectName != null && i == dds.length)
        throw new
RuntimeException(mf.format("ERROR_VFY_NOBEANINJAR",
            ejbObjectName, jarName));
}
static void main(String args[ ])
{
    String jarName = null;
    String beanName = null;
    MessageFormatter mf;
    mf = new MessageFormatter(
        "com.ibm.ejb.cb.emit.cb.EJBDeployResourceBundle");
    if(args.length < 2)
    {
        System.out.println(mf.format("ERROR_VFY_USAGE"));
        System.exit(1);
    }
    for(int i = 0 ; i < args.length; i++)
    {
        if(args[i].equals("-jar") && (i < args.length - 1))
        {
            jarName = args[++i];
        }
        if(args[i].equals("-bean") && (i < args.length -
1))
        {
            beanName = args [++i];
        }
    }
    if(jarName == null)
    {
        System.out.println(mf.format("ERROR_VFY_USAGE"));
        System.exit(1);
    }
```

-continued package com.ibm.ejb.cb.emit.cb

```
    try
    {
        EJBVerify.verifyJar(jarName, beanName);
        System.out.println(mf.format("INFO_VFY_SUCC",
beanName, jarName));
    }
    catch(RuntimeException e)
    {
        System.out.println(e.getMessage( ));
        System.exit(1);
    }
    System.exit(0);
}
public static boolean fieldEquals(Field f1, Field f2)
{
    if(f1.getName( ).equals(f2.getName( )) &&
        f1.getType( ).equals(f2.getType( )) &&
        f1.getModifiers( ) == f2.getModifiers( ))
        return true;
    return false;
}
public boolean methodEquals(Method m1, Method m2)
{
    if(!m1.getName( ).equals(m2.getName( )) ||
        !m1.getReturnType( ).equals(m2.getReturnType( )))
//      || (m1.getModifiers( ) | 1024) !=
(m2.getModifiers( ) | 1024))
        return false;
    Class paras1[ ]= m1.getParameterTypes( );
    Class paras2[ ]= m2.getParameterTypes( );
    if((paras1 == null || paras1.length < 1) &&
        (paras2 == null || paras2.length < 1))
        return true;
    if(paras1 == null || paras1.length != paras2.length ||
paras1 == null)
        return false;
    for(int i = 0; i < paras1.length; i++)
    {
        if(!paras1[i].equals(paras2[i]))
            return false;
    }
    return true;
}
protected String inValidCMFieldTypeMsg(Field fld)
{
    return mf.format("ERROR_VFY_CMF", fld.getName( ));
}
protected Method[ ] getClassMethods(Class cls)
{
    Method methods [ ] = cls.getMethods( );
    if(methods == null)
    {
        error += mf.format("ERROR_VFY_OBJDECMETHOD",
cls.getName( ));
        foundError( );
    }
    return(methods);
}
public static boolean isRemoteInterface(Class intf)
{
    if(!intf.isInterface( ))
        return false;
    System.out.println("EJBVerify is Remote " + intf);
    Method methods[ ] = intf.getMethods( );
    if(methods == null)
    {
        MessageFormatter mf = new MessageFormatter(
"com.ibm.ejb.cb.emit.cb.EJBDeployResourceBundle");
        throw new RuntimeException(
            mf.format("ERROR_VFY_OBJDECMETHOD",
intf.getName( )));
    }
    if(methods.length < 1)
        return true;
    for(int i = 0; i < methods.length; i++)
    {
        Class expts[ ] = methods[i].getExceptionTypes( );
```

-continued

```
package com.ibm.ejb.cb.emit.cb if(expts == null || expts.length < 1)
            return false;
        int j = 0;
        for(j = 0; j < expts.length; j++)
            if(expts [j] == java.rmi.RemoteException.class)
                break;
        if(j == expts.length)
            return false;
    }
    return true;
    }
}
```

While the invention has been particularly shown and described with reference to a preferred embodiment, it will be understood by those skilled in the art that various changes in form and detail may be made therein without departing from the spirit and scope of the invention.

What is claimed is:

1. A method for determining validity of a server side object, said method comprising:
   receiving an archive file in a data processing system memory location;
   loading said archive file containing a server side object onto a server connected to said data processing system;
   loading said server side object to a server memory, wherein said server side object is an
   Enterprise Java Bean;
   providing access by multiply clients to said server side object, wherein said multiple clients may be deployed on a separate data processing system;
   introspecting, with reference to a standard, a deployment descriptor class, a remote interface, a home interface and a bean class of said archive file;
   displaying a descriptive error for any non-compliant portion of said server side object; and
   validating said server side object if no errors are displayed.

2. The method of claim 1, further comprising:
   providing error messages, wherein said error messages correspond to server side object specification violations.

3. The method of claim 1, further comprising:
   developing said server side object for implementation on multiple data processing systems having different operating systems.

4. The method of claim 3, wherein developing said server side object for implementation on multiple data processing systems each having a different operating system, further comprises:
   determining validity of said server side object utilizing a Java Archive file of said Bean.

5. The method of claim 1, wherein loading said server side object, wherein said server side object is an Enterprise Java Bean, further comprises:
   importing said Enterprise Java Bean from an off-system source.

6. A computer program product within a computer readable medium having instructions for determining validity of a server side object, said computer program product comprising:
   instructions within said computer readable medium for receiving an archive file in a data processing system memory location;
   instructions within said computer readable medium for loading said archive file containing a server side object onto a server connected to said data processing system;
   instructions within said computer readable medium for loading said server side object to a server memory wherein said server side object is an Enterprise Java Bean;
   instructions within said computer readable medium for providing access by multiple clients to said server side object, wherein said multiple clients may be deployed on a separate, connected data processing system;
   instructions within said computer readable medium for displaying a descriptive error for any non-compliant portion of aid server side object; and
   instructions within said computer readable medium for validating said server side object if no errors are displayed.

7. The program product of claim 6, further comprising:
   instructions within said computer readable medium for providing error messages, wherein said error messages correspond to server side object specification violations.

8. The program product of claim 6, further comprising:
   instructions within said computer readable medium for developing said server side object for implementation on different data processing systems having different operating systems.

9. The program product of claim 8, wherein developing said server side object for implementation on multiple data processing systems each having a different operating system, further comprises:
   instructions within said computer readable medium for determining validity of said server side object utilizing a Java Archive file of said Bean.

10. The program product of claim 6, wherein loading said server side object, wherein said server side object is an Enterprise Java bean, further comprises:
    instructions within said computer readable medium for importing said Enterprise Java Bean from an off-system source.

11. An apparatus for determining validity of a server side object, comprising:
    a network;
    a data processing system connected to said network;
    a server for receiving said server side object, connected to said data processing system;
    an archive file containing said server side object, wherein said archive file comprises a deployment descriptor class, a remote interface, a home interface and a bean class;
    an introspection tool for verifying said server side object:
    error signaling means for displaying a descriptive error for any non-compliant portion of said server side object; and
    confirmation signaling means for displaying validation of said server side object.

12. The apparatus of claim 11, wherein said server said object is an Enterprise Java Bean.

13. The apparatus of claim 12, further comprising:
    error signal messages corresponding to server side object specification violations.

14. The apparatus of claim 13, further comprising:
    validation means for verifying said server side object on multiple data processing systems having different operating systems.

* * * * *